(12) United States Patent
Jin et al.

(10) Patent No.: US 12,375,773 B2
(45) Date of Patent: Jul. 29, 2025

(54) METHOD AND SYSTEM FOR DISPLAYING INFORMATION ON PAGE

(71) Applicant: SHANGHAI BILIBILI TECHNOLOGY CO., LTD., Shanghai (CN)

(72) Inventors: Binwu Jin, Shanghai (CN); Lu Cai, Shanghai (CN); Xin Jing, Shanghai (CN); Tongbin Lv, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 35 days.

(21) Appl. No.: 18/388,517

(22) Filed: Nov. 9, 2023

(65) Prior Publication Data
US 2024/0163521 A1    May 16, 2024

(30) Foreign Application Priority Data

Nov. 11, 2022   (CN) .......................... 202211417060.4

(51) Int. Cl.
*H04N 21/482* (2011.01)
*G06F 3/04817* (2022.01)
*G06F 3/0482* (2013.01)
*G06F 3/0488* (2022.01)

(52) U.S. Cl.
CPC ..... *H04N 21/4826* (2013.01); *G06F 3/04817* (2013.01); *G06F 3/0482* (2013.01); *G06F 3/0488* (2013.01)

(58) Field of Classification Search
CPC ............ H04N 21/4826; G06F 3/04817; G06F 3/0482; G06F 3/0488
See application file for complete search history.

(56) References Cited

U.S. PATENT DOCUMENTS

| | | | |
|---|---|---|---|
| 7,966,638 B2 * | 6/2011 | Gossweiler, III | H04N 21/262 725/44 |
| 10,219,027 B1 * | 2/2019 | O'Neill | H04N 21/4312 |
| 10,725,615 B2 * | 7/2020 | Bockhold | G06Q 50/01 |

(Continued)

FOREIGN PATENT DOCUMENTS

| | | |
|---|---|---|
| CN | 108881994 A | 11/2018 |
| CN | 111596830 A | 8/2020 |

(Continued)

OTHER PUBLICATIONS

China Patent Application No. 202211417060.4; First Office Action; dated Aug. 20, 2024; 19 pages.

*Primary Examiner* — James R Sheleheda
(74) *Attorney, Agent, or Firm* — BakerHostetler (57) ABSTRACT

The present application provides techniques for displaying information pages. The techniques comprise in response to an operation of starting a client application by a user, displaying a first page comprising a navigation bar and displaying an image of a recommended creator in a preset area of the navigation bar; and in response to detecting a touch operation on the image of the recommended creator, jumping from the first page to a second page and displaying the image of the recommended creator at a top position in a predetermined area of the second page, wherein the predetermined area is configured to display images of a plurality of recommended creators based on information of the user.

12 Claims, 8 Drawing Sheets

In response to an operation of starting a client, display a first page including a navigation bar on the client, and display an image of a recommended user in a preset area of the navigation bar — S202

Jump from the first page to a second page when a touch operation on the image of the recommended user is detected, and display the image of the recommended user at a top position in a fixed area of the second page, where the fixed area is used to display images of a plurality of users recommended based on user information — S204

(56) References Cited

U.S. PATENT DOCUMENTS

| | | | | |
|---|---|---|---|---|
| 10,817,168 | B1* | 10/2020 | Lewis | G06F 3/04883 |
| 10,911,832 | B2* | 2/2021 | Paglia | H04N 21/26258 |
| 11,675,860 | B1* | 6/2023 | Church | G06F 18/2431 |
| | | | | 705/319 |
| 11,687,576 | B1* | 6/2023 | Katz | H04N 21/4882 |
| | | | | 715/254 |
| 11,791,920 | B1* | 10/2023 | Barge | H04H 60/87 |
| | | | | 455/2.01 |
| 11,870,830 | B1* | 1/2024 | Bhatia | H04L 65/70 |
| 11,943,516 | B1* | 3/2024 | Liu | H04N 21/8173 |
| 2008/0244681 | A1* | 10/2008 | Gossweiler | H04N 21/4755 |
| | | | | 725/133 |
| 2009/0271283 | A1* | 10/2009 | Fosnacht | G06Q 30/0601 |
| | | | | 705/40 |
| 2011/0289009 | A1* | 11/2011 | Rankin, Jr. | G06Q 10/10 |
| | | | | 707/769 |
| 2011/0321072 | A1* | 12/2011 | Patterson | H04N 21/432 |
| | | | | 725/5 |
| 2012/0158524 | A1* | 6/2012 | Hintz | G06Q 30/0277 |
| | | | | 705/14.73 |
| 2013/0073568 | A1* | 3/2013 | Federov | G06Q 30/0269 |
| | | | | 707/E17.069 |
| 2013/0124584 | A1* | 5/2013 | Otto | G06F 16/638 |
| | | | | 707/822 |
| 2013/0145251 | A1* | 6/2013 | Jureidini | G06F 16/986 |
| | | | | 715/234 |
| 2013/0227038 | A1* | 8/2013 | Rich | G06F 16/40 |
| | | | | 709/206 |
| 2013/0254265 | A1* | 9/2013 | Chemla | H04L 67/10 |
| | | | | 709/203 |
| 2015/0358584 | A1* | 12/2015 | Mattson | G06Q 10/101 |
| | | | | 348/14.08 |
| 2016/0054867 | A1* | 2/2016 | Lee | G06F 3/0482 |
| | | | | 715/778 |
| 2016/0357355 | A1* | 12/2016 | Carrigan | H04L 67/1097 |
| 2017/0153774 | A1* | 6/2017 | Nie | H04N 21/6125 |
| 2017/0279867 | A1* | 9/2017 | Morton | H04W 4/21 |
| 2017/0337270 | A1* | 11/2017 | Koch | G06F 16/435 |
| 2018/0052851 | A1* | 2/2018 | Lewis | H04N 21/431 |
| 2019/0179919 | A1* | 6/2019 | Lewis | G06F 9/547 |
| 2019/0342616 | A1* | 11/2019 | Domm | G06Q 50/01 |
| 2021/0232942 | A1* | 7/2021 | Lo | G06N 20/00 |
| 2022/0060436 | A1* | 2/2022 | Persidsky | H04L 63/123 |
| 2022/0197448 | A1* | 6/2022 | Wang | H04N 21/2187 |
| 2022/0253492 | A1* | 8/2022 | Gao | H04L 51/04 |
| 2022/0261936 | A1* | 8/2022 | Kosarek | G06Q 50/01 |
| 2022/0337898 | A1* | 10/2022 | Dorogusker | H04N 21/2187 |
| 2023/0007333 | A1* | 1/2023 | Bancs | H04N 21/2743 |
| 2023/0065048 | A1* | 3/2023 | Takakuwa | G06F 3/011 |
| 2023/0140948 | A1* | 5/2023 | Li | H04N 21/4788 |
| | | | | 725/14 |
| 2023/0221828 | A1* | 7/2023 | Zhong | G06F 3/0481 |
| | | | | 715/781 |
| 2023/0385330 | A1* | 11/2023 | Zhu | G06F 16/953 |
| 2023/0388604 | A1* | 11/2023 | Yang | H04N 21/4788 |
| 2023/0396849 | A1* | 12/2023 | Owens | H04N 21/44204 |
| 2023/0403412 | A1* | 12/2023 | Wang | G06F 3/14 |
| 2024/0284016 | A1* | 8/2024 | Li | H04N 21/4826 |

FOREIGN PATENT DOCUMENTS

| | | |
|---|---|---|
| CN | 113613055 A | 11/2021 |
| CN | 113794894 A | 12/2021 |
| CN | 114564657 A | 5/2022 |

* cited by examiner

METHOD AND SYSTEM FOR DISPLAYING INFORMATION ON PAGE

CROSS-REFERENCE TO RELATED APPLICATION

The present application claims priority to Chinese Patent Application No. 202211417060.4, filed on Nov. 11, 2022, which is incorporated herein by reference in its entirety.

BACKGROUND ART

In the prior art, when a user starts a video playback application, the application generally displays a home page. The home page may display videos. The home page may also provide controls corresponding to entries for some functional modules.

At present, most platforms provide reminders by displaying a number of dynamically updated videos or a red dot. Such a method of providing reminders makes it difficult for the user to learn information about updated content (such as a creator of the updated content or a type of the updated content), and updates of content created by creators that are particularly followed or have a high degree of intimacy may be obscured by a wide range of updates.

SUMMARY OF THE INVENTION

An objective of the embodiments of the present application is to provide a method and system for displaying information on a page, a computer device, and a computer-readable storage medium, to solve the following problems: An existing method of providing video update reminders makes it difficult for a user to learn information about updated content on a current activities page, and updates of content creators that are particularly followed or have a high degree of intimacy may be overshadowed by a wide range of updates.

An aspect of the embodiments of the present application provides a method for displaying information on a page, including:
  in response to an operation of starting a client, displaying a first page including a navigation bar on the client, and displaying an image of a recommended creator in a preset area of the navigation bar; and
  jumping from the first page to a second page when a touch operation on the image of the recommended creator is detected, and displaying the image of the recommended creator at a top position in a fixed area of the second page, where the fixed area is used to display images of a plurality of users recommended based on user information.

Optionally, the image of the recommended creator includes a first image used to indicate update of a recorded video and a second image used to indicate live streaming of a live streaming room.

Optionally, the displaying an image of a recommended creator in a preset area of the navigation bar includes:
  determining a type of an updated video corresponding to the recommended creator; and
  displaying the first image in the preset area of the navigation bar when the type of the updated video is a recorded type; or
  displaying the second image in the preset area of the navigation bar when the type of the updated video is a live streaming type.

Optionally, the displaying an image of a recommended creator in a preset area of the navigation bar includes:
  sending a first message requesting the recommended creator to a server;
  receiving an identification code corresponding to the recommended creator that is returned by the server in response to the first message; and
  displaying the image of the recommended creator in the preset area of the navigation bar based on the identification code corresponding to the recommended creator.

Optionally, the navigation bar includes a second page control, and the preset area is a display area for the second page control on the navigation bar.

Optionally, the method further includes:
  hiding the image of the recommended creator when no touch operation on the image of the recommended creator is detected for more than a preset duration, and displaying the second page control in the preset area.

Optionally, the displaying the image of the recommended creator at a top position in a fixed area of the second page includes:
  sending a second message requesting a most frequently visited user list to a server;
  receiving a most frequently visited user list returned by the server in response to the second message; and
  displaying an image list corresponding to the most frequently visited user list in the fixed area of the second page, and displaying the image of the recommended creator at a top position in the image list.

Optionally, the second message carries an identification code corresponding to the recommended creator; and the most frequently visited user list is obtained by the server by determining a plurality of active users based on the user information, and sorting identification codes corresponding to the recommended creator and the plurality of active users.

Optionally, the second page further includes an activities information stream list, and the method further includes:
  displaying a video window corresponding to the recommended creator at a top position in the activities information stream list, and playing an updated video corresponding to the recommended creator in the video window.

An aspect of the embodiments of the present application further provides a system for displaying information on a page, including:
  a first page display module configured to: in response to an operation of starting a client, display a first page containing a navigation bar on the client, and display an image of a recommended creator in a preset area of the navigation bar; and
  a second page display module configured to jump from the first page to a second page when a touch operation on the image of the recommended creator is detected, and display the image of the recommended creator at a top position in a fixed area of the second page, where the fixed area is used to display images of a plurality of users recommended based on user information.

An aspect of the embodiments of the present application further provides a computer device, including a memory, a processor, and a computer program stored on the memory and executable on the processor, where the computer program, when executed by the processor, implements the steps of the method for displaying information on a page as described above.

An aspect of the embodiments of the present application further provides a computer-readable storage medium storing a computer program that may be executed by at least one processor to cause the at least one processor to implement, when executing the computer program, the steps of the method for displaying information on a page as described above.

According to the method and system for displaying information on a page, the device, and the computer-readable storage medium provided in the embodiments of the present application, the recommended creator that needs to be displayed at the top position on the second page is selected, and the image of the recommended creator is displayed when the user enters the first page, to remind the user that the recommended creator has updated a video that can be viewed on the second page. Furthermore, when the user taps on the image of the recommended creator to enter the second page, the image of the recommended creator is promoted and displayed at the top position, to prevent updated content of users that are particularly followed or have a high degree of intimacy from being obscured by a wide range of updated content, so that the content updated by the users that are particularly followed or have a high degree of intimacy can be easily found for viewing without further screening.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Therefore, a feature defined by "first" or "second" may explicitly or implicitly includes at least one feature. Additionally, technical solutions in various embodiments may be combined with each other, provided that they can be implemented by persons of ordinary skill in the art. When a combination of the technical solutions incurs conflict or cannot be implemented, it should be considered that such a combination of the technical solutions does not exist, and does not fall within the claimed scope of protection of the present application either.

In the prior art, on navigation bars of most platforms, activities update reminders are provided in an area where activities page controls are displayed. Generally, these reminders are provided by displaying the number of dynamically updated videos or a red dot. Such a method of providing reminders has the following disadvantages. 1. It is difficult for a user to know information about an updated video, for example, whether the update is a video of a live streaming room or a recorded video. 2. Updates of content creators that are particularly followed or have a high degree of intimacy may be obscured by a wide range of updates. 3. After tapping on the reminder, the user enters a feed stream list, which cannot implement linkage display to give the user a clear expectation for content consumption.

In view of this, the present application aims to propose a method for displaying information on a page, including: in response to an operation of starting a client, displaying a first page including a navigation bar on the client, and displaying an image of a recommended creator in a preset area of the navigation bar; and jumping from the first page to a second page when a touch operation on the image of the recommended creator is detected, and displaying the image of the recommended creator at a top position in a fixed area of the second page, where the fixed area is used to display images of a plurality of users recommended based on user information. In this way, the recommended creator that needs to be displayed at the top position on the second page, for example, an uploader having a higher degree of intimacy with the user, an uploader that the user particularly follows, or an uploader that is live streaming, may be selected based on the big data capability, and the image of the recommended creator is displayed when the user enters the first page, to remind the user that the recommended creator has updated a video that can be viewed on the second page. Furthermore, when the user taps on the image of the recommended creator to enter the second page, the image of the recommended creator is promoted and displayed at the top position, to prevent updated content of users that are particularly followed or have a high degree of intimacy from being obscured by a wide range of updated content, so that the content updated by the users that are particularly followed or have a high degree of intimacy can be found for viewing without further screening.

The present application provides a plurality of embodiments to further describe the solution for displaying information on a page, which are specifically as follows.

In the description of the present application, it should be understood that, the reference numerals of steps do not indicate the order of execution of the steps, but are merely to facilitate the description of the present application and differentiation between the steps, and thus will not be interpreted as limiting the present application.

Terms in the present application are explained below:

Uploader: a creator for content, including video/text/picture or other content.

Home page: a default page displayed when an application is started.

Bottom bar: a row of functional module entries at the bottom of a page that is displayed in a resident application, where the bottom bar is generally horizontally arranged and may include entries for dynamic functional modules.

Activities card: a display unit in a dynamic system of an application.

Activities comprehensive page: a page displayed by the dynamic system when an activities section on the bottom bar is triggered, and the top of the activities comprehensive page may be marked with the word "comprehensive".

Feed stream: an information stream that is continuously updated and presents content to users.

Most frequently visited object: a most frequently visited object on the activities comprehensive page, where a list of profile photos corresponding to most frequently visited objects may be displayed horizontally at the top of the activities comprehensive page.

Figure 1:
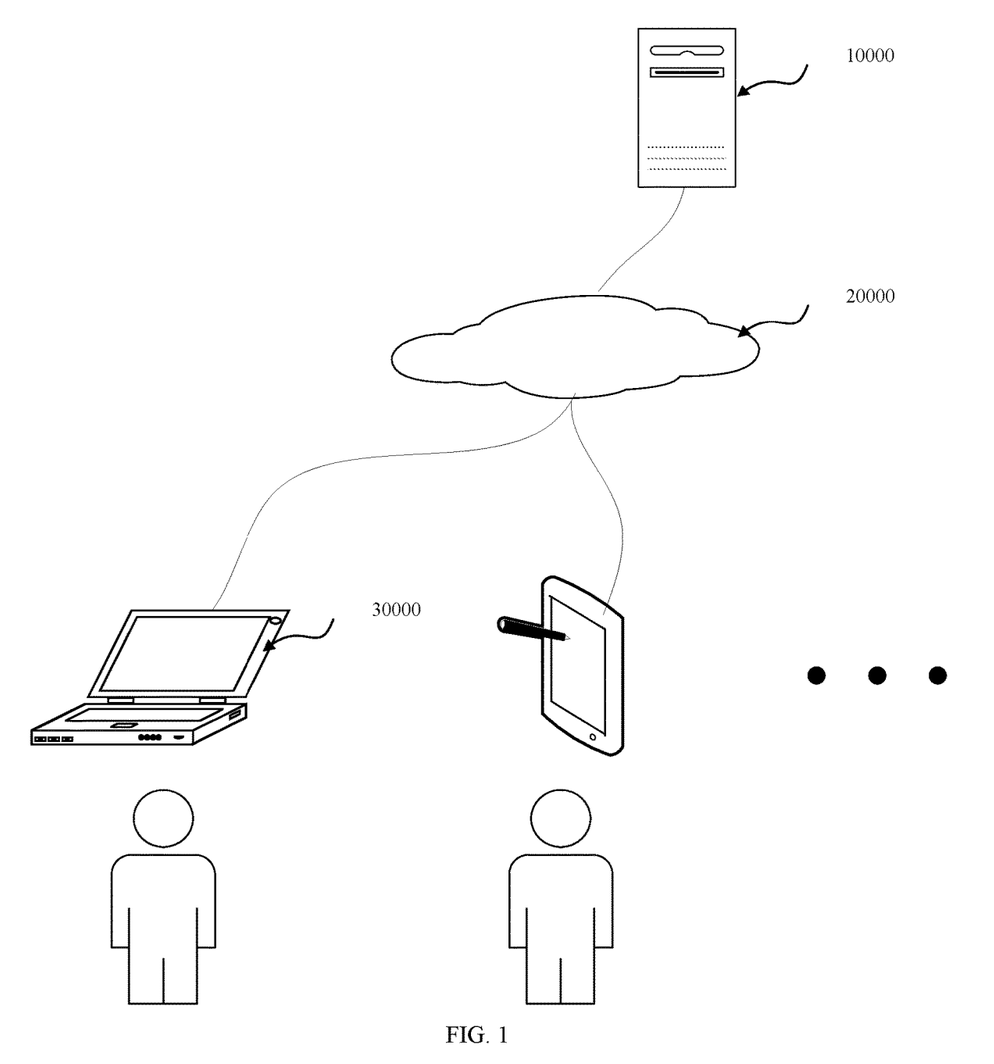
FIG. 1 is a diagram schematically showing an application environment of a method for displaying information on a page according to an embodiment of the present application.

FIG. 1 is a schematic diagram schematically showing environment application according to an embodiment of the present application. As shown in FIG. 1:

The computer device 10000 may be connected to a client 30000 via a network 20000.

The computer device 10000 may provide services, for example, performing network debugging, returning information display result data on a page to the client 30000, etc.

The computer device 10000 may be located in a data center, for example, on a single site, or distributed at different geographical positions (for example, on a plurality of sites). The computer device 10000 may provide services via one or more networks 20000. The network 20000 includes various network devices, for example, routers, switches, multiplexers, hubs, modems, network bridges, repeaters, firewalls, proxy devices, and/or the like. The network 20000 may include physical links, for example, coaxial cable links, twisted-pair cable links, optical fiber links, and a combination thereof. The network 20000 may include wireless links, such as cellular links, satellite links, and Wi-Fi links.

The computer device 10000 may be implemented by one or more computing nodes. The one or more computing nodes may include a virtualized computing instance. The virtualized computing instance may include a virtual machine, for example, a simulation of a computer system, an operating system, or a server. The computing node may be based on virtual images and/or other data that defines specific software (such as an operating system, a dedicated application, or a server) used for simulation, and the virtual machine is loaded by the computing node. As requirements on different types of processing services change, different virtual machines may be loaded and/or terminated on the one or more computing nodes. It is possible to implement that the use of different virtual machines on the same computing node is managed by management programs.

The client 30000 may be configured to access content and services of the computer device 10000. The client 30000 may include any type of electronic devices, for example, mobile devices, tablet devices, laptop computers, workstations, virtual reality devices, game devices, set-top boxes, digital streaming media devices, vehicle terminals, smart televisions, and set-top boxes.

The client 30000 may output (for example, display, render, or present) information display result data and the like on a page to a user.

A network debugging solution is described below through a plurality of embodiments. This solution may be implemented by the computer device 10000.

Embodiment 1

Figure 2:
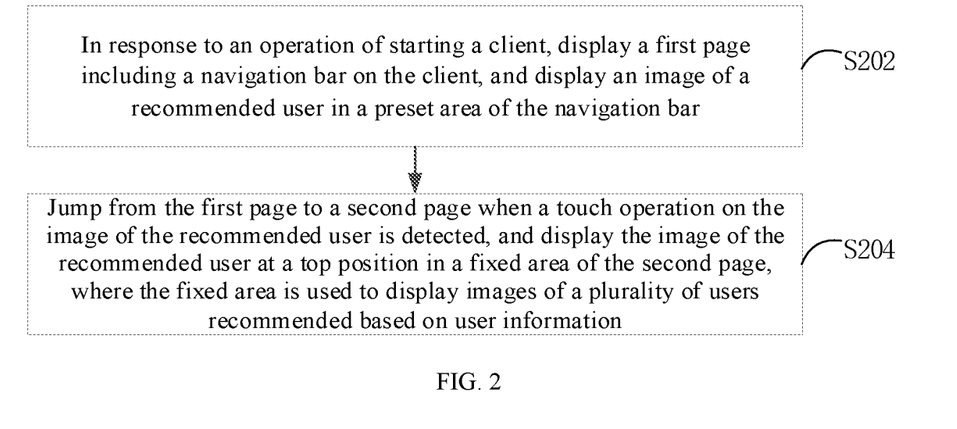
FIG. 2 is a flowchart schematically showing a method for displaying information on a page according to Embodiment 1 of the present application.

FIG. 2 is a flowchart schematically showing a method for displaying information on a page according to Embodiment 1 of the present application. The method includes steps S202 to S204.

In step S202, in response to an operation of starting a client, a first page including a navigation bar is displayed on the client, and an image of a recommended creator is displayed in a preset area of the navigation bar.

In this embodiment, the client may be a user client provided for a user to watch recorded videos or live streaming videos. After the user installs an application in a terminal device, the user taps on an icon of the application to start the client. The terminal device has a data collection module for user operations, and the operation of the user starting the client is collected by the data collection module and reported to the client. After receiving the operation of starting the client, the client may respond to the operation of starting the client by displaying a first page including a navigation bar on the client. The first page may include a navigation bar. In addition, the first page may also include a video search bar, a plurality of video windows, carousel recommendation cards, and the like. During specific implementation, the navigation bar may include entry controls for pages such as the first page, a second page, video publishing, and personal information, and the user may tap on these controls on the navigation bar to jump to pages. In an example, the first page may be a home page, and the second page may be an activities comprehensive page.

Figure 3:
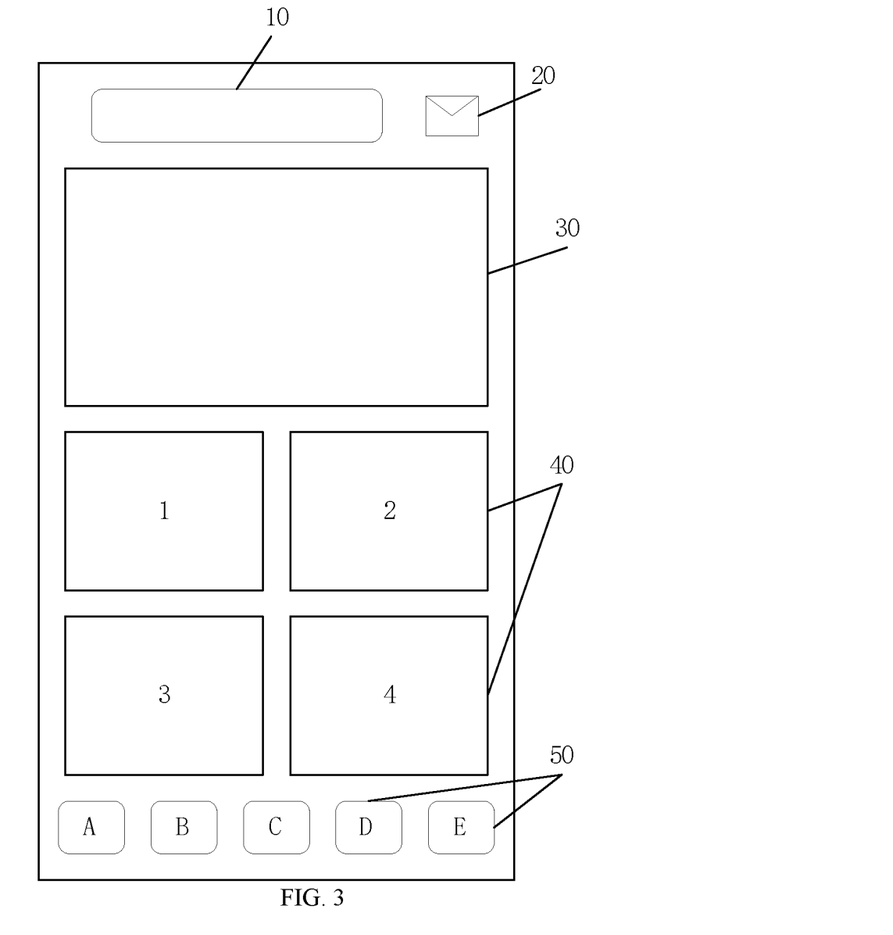
FIG. 3 is a schematic diagram schematically showing a first page according to Embodiment 1 of the present application.

The image of the recommended creator may be displayed in the preset area of the navigation bar when the first page is displayed. The preset area is an area with a specific size set in advance. In this embodiment, the preset area may be a display area for a second page control on the navigation bar. The recommended creator may be an uploader having a higher degree of intimacy with the user, an uploader that the user particularly follows, an uploader that is live streaming, etc. During specific implementation, an AI recommendation module may be deployed in a server. The AI recommendation module includes a preset recommendation strategy. The recommended creator is selected according to the recommendation strategy by using the AI recommendation module, and then an identification code of the recommended creator is returned to the client, and the client may display the image of the recommended creator in the preset area of the navigation bar on the first page based on the identification code of the recommended creator. FIG. 3 is a schematic diagram of a first page. The first page includes a video search bar 10, a message control 20, a carousel recommendation card 30, four video windows 40, and a navigation bar 50. The four video windows 40 are windows 1, 2, 3, and 4, respectively. The navigation bar 50 includes five navigation controls, which are controls A, B, C, D, and E respectively. Assuming that a position of the control B is the display area for the second page control on the navigation bar, the image of the recommended creator may be displayed at the position of the control B.

The image of the recommended creator is displayed on the navigation bar on the first page to remind the user that there is an updated video published by the recommended creator, which solves the problem of the conventional reminder method that it is difficult for a user to know which user has updated content.

In step S204, jumping from the first page to a second page is performed when a touch operation on the image of the recommended creator is detected, and the image of the recommended creator is displayed a top position in a fixed area of the second page, where the fixed area is used to display images of a plurality of users recommended based on user information.

The touch operation is used to trigger opening of the second page, and may include operations such as single tap, double tap, long press, or a specified gesture, which is not specifically limited in this embodiment of the present application. In this embodiment, the user may trigger a jump to the second page by performing a touch operation on the image of the recommended creator on the navigation bar. When the client detects the touch operation on the image of the recommended creator, it jumps from the first page to the second page, and displays the image of the recommended creator at the top position in the fixed area of the second page, so that updated content of the recommended creator may be prevented from being obscured by a wide range of updated content. It should be noted that, in this embodiment, the fixed area is a pre-specified area, the fixed area is used to display the images of the plurality of users based on the user information, and the user may play updated videos of these users through the images of the users displayed in the fixed area.

Several optional embodiments are provided below to optimize the method for displaying information on a page, specifically as follows.

In a preferred embodiment of the present application, the image of the recommended creator includes a first image used to indicate update of a recorded video and a second image used to indicate live streaming of a live streaming room.

In this embodiment, the image of the recommended creator may include two types of images, so that the user may know, based on the image of the recommended creator displayed on the first page, whether the update from the recommended creator is a live streaming video or a recorded video, which further increases an amount of information provided to users for reminders.

In a preferred embodiment of the present application, step S202 may specifically include the following steps:
  determining a type of an updated video corresponding to the recommended creator; and
  displaying the first image in the preset area of the navigation bar when the type of the updated video is a recorded type; or displaying the second image in the preset area of the navigation bar when the type of the updated video is a live streaming type.

In this embodiment, when displaying the image of the recommended creator, the client may further determine the type of the updated video corresponding to the recommended creator; and display the first image in the preset area of the navigation bar when the type of the updated video is a recorded type; or display the second image in the preset area of the navigation bar when the type of the updated video is a live streaming type. Therefore, the user may directly know, based on the first image or second image displayed on the first page, whether updated content of the recommended creator is a recorded video or live streaming of a live streaming room, and if it is live streaming of a live streaming room, the user may watch the live streaming in time to avoid missing it, or if it is a recorded video, the user may watch it in free time.

In a preferred embodiment of the present application, step S202 may specifically include the following steps:
  sending a first message requesting the recommended creator to a server; receiving an identification code corresponding to the recommended creator that is returned by the server in response to the first message; and displaying the image of the recommended creator in the preset area of the navigation bar based on the identification code corresponding to the recommended creator.

In this embodiment, when the first page needs to be displayed, the client may send the first message requesting the recommended creator to the server, so as to obtain the recommended creator that needs to be displayed at the top position on the first page. During specific implementation, a user who create content may also be called an uploader. After receiving the first message requesting the recommend user, the server may respond to the first message and select, from uploaders that the user follows, an uploader who currently has a recorded video update and an uploader who is currently live streaming, and then select the recommended creator from them according to a preset strategy. For example, the server selects an uploader having the highest intimacy as the recommended creator, or selects an uploader that is particularly followed as the recommended creator, determine an uploader as the recommended creator by using a random algorithm, etc., which is not specifically limited in this embodiment of the present application.

After determining the recommended creator, the server may return the identification code corresponding to the recommended creator, where the identification code is a unique identity of the user, and each user has a corresponding identification code. After receiving the identification code corresponding to the recommended creator, the client displays the image of the recommended creator in the preset area of the navigation bar based on the identification code corresponding to the recommended creator.

In a preferred embodiment of the present application, the method further includes the following steps:
  hiding the image of the recommended creator when no touch operation on the image of the recommended creator is detected for more than a preset duration, and displaying the second page control in the preset area.

In this embodiment, the navigation bar includes the second page control, and the preset area is a display area for the second page control on the navigation bar. After the image of the recommended creator is displayed, a timer may be started for timing, the image of the recommended creator is hidden when no touch operation on the image of the recommended creator is detected for more than a preset duration, and the second page control is displayed in the preset area of the navigation bar. The preset duration is a preset time length, for example, 10 seconds. If no touch operation on the image of the recommended creator is detected for more than 10 seconds, the image of the recommended creator is automatically hidden.

It should be noted that when the second page control is displayed in the preset area of the navigation bar, if there is an updated video on the second page, the number of dynamically updated videos may also be displayed, a red dot may be displayed, etc., so as to remind the user of the updated video on the second page.

In a preferred embodiment of the present application, step S204 may include the following steps:

sending a second message requesting a most frequently visited user list to a server; receiving a most frequently visited user list returned by the server in response to the second message;

and displaying an image list corresponding to the most frequently visited user list in the fixed area of the second page, and displaying the image of the recommended creator at a top position in the image list.

In this embodiment, when there is a need to jump to the second page, the client may send the second message requesting the most frequently visited user list to the server, so as to obtain the most frequently visited user list. The second message may carry an identification code corresponding to the recommended creator. The most frequently visited user list is obtained by the server by determining a plurality of active users and sorting identification codes corresponding to the recommended creator and the plurality of active users. Specifically, during sorting, the recommended creator may be arranged at a first position, and the other users may be arranged according to a degree of activity or intimacy. In addition, the factor of whether a user is live streaming may be considered and the user who is live streaming is arranged ahead of other users, and the factor of whether a user has an updated video is considered and the user who has an updated video is arranged ahead of other users.

Figure 4:
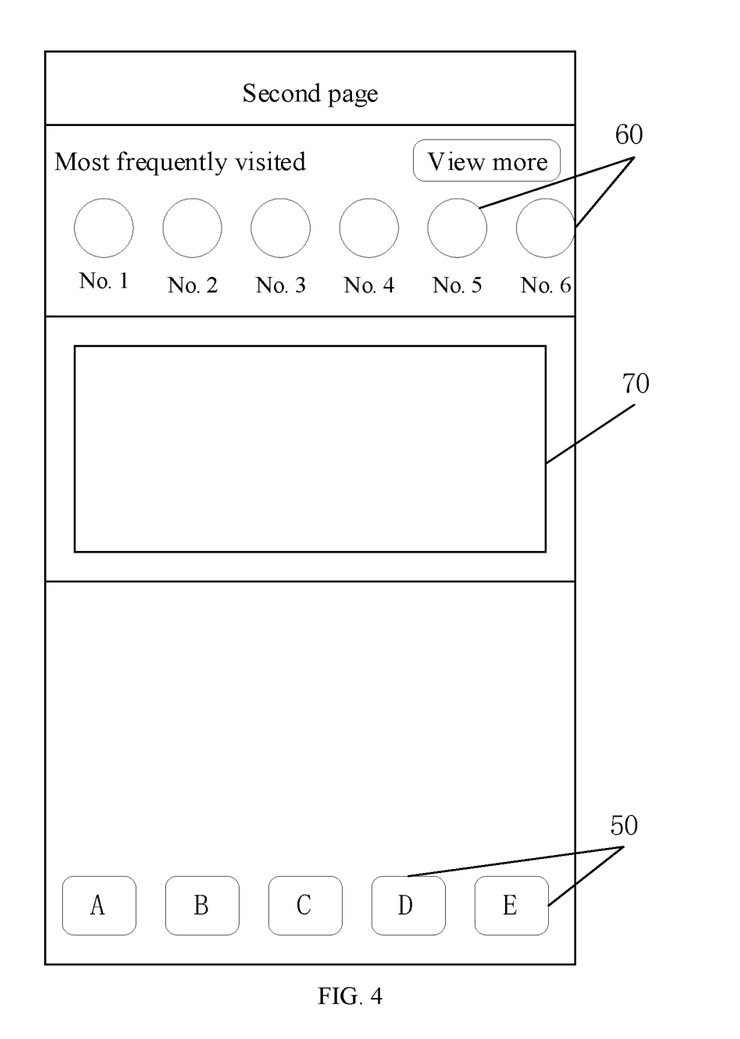
FIG. 4 is a schematic diagram schematically showing a second page according to Embodiment 1 of the present application.

After receiving the most frequently visited user list returned by the server, the client may display an image list corresponding to the most frequently visited user list in the fixed area of the second page, and display the image of the recommended creator at a top position in the image list. FIG. 4 is a schematic diagram of a second page. The second page includes an image list 60. The image list 60 includes images corresponding to six users in the most frequently visited user list, which are an image No. 1, an image No. 2, an image No. 3, an image No. 4, an image No. 5, and an image No. 6, respectively. The image No. 1 is the image of the recommended creator, and the image of the recommended creator is displayed at a top position in the image list 60, so as to prevent updated content of the recommended creator from being obscured by a wide range of updated content. In addition, the second page may further include a navigation bar 50 and a hot topic bar 70. The hot topic bar 70 is used to display information about some current hot topics.

In a preferred embodiment of the present application, the second page further includes an activities information stream list, and the method further includes:

displaying a video window corresponding to the recommended creator at a top position in the activities information stream list, and playing an updated video corresponding to the recommended creator in the video window.

Figure 5:
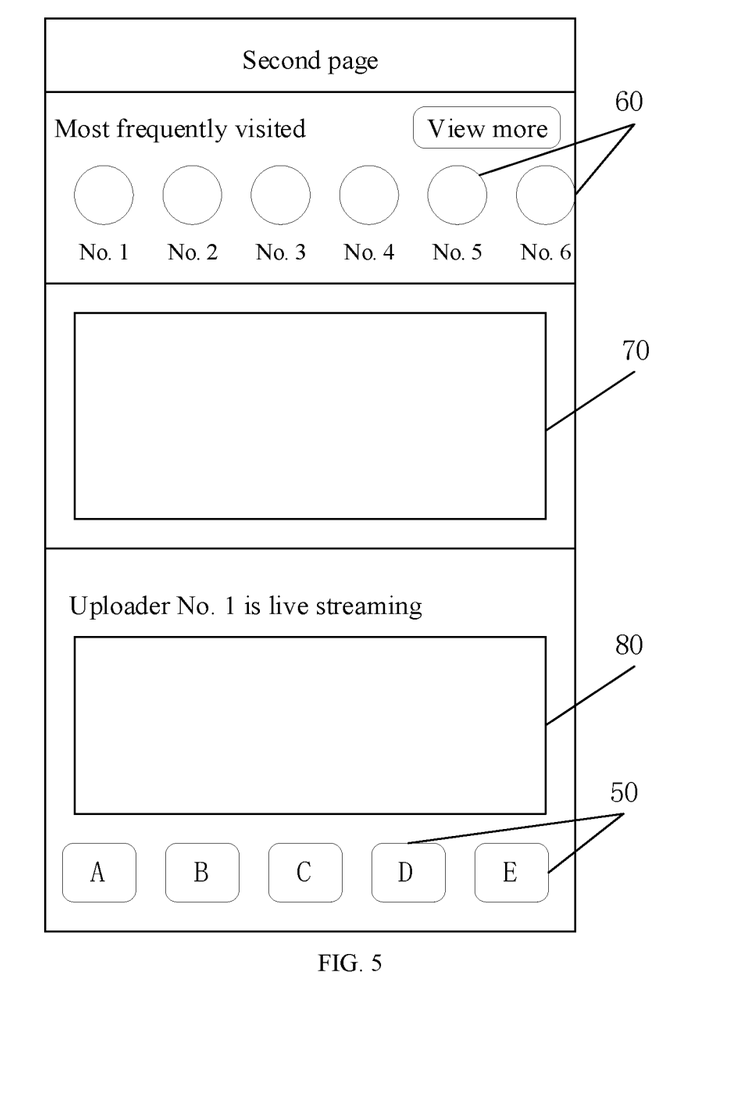
FIG. 5 is another schematic diagram schematically showing a second page according to Embodiment 1 of the present application.

In this embodiment, the second page further includes an activities information stream list, and the activities information stream list is used for continuously updating and displaying an activities information stream. When the second page is displayed, the video window corresponding to the recommended creator may also be displayed at the top position in the activities information stream list, and an updated video corresponding to the recommended creator is played in the video window. FIG. 5 is another schematic diagram of the second page. In addition to the image list 60, the hot topic bar 70, and the navigation bar 50, the second page may include an activities information stream list 80. In this example, assuming that a recommended creator No. 1 is live streaming, a video of a live streaming room corresponding to the recommended creator No. 1 may be directly played in the activities information stream list 80.

Figure 6:
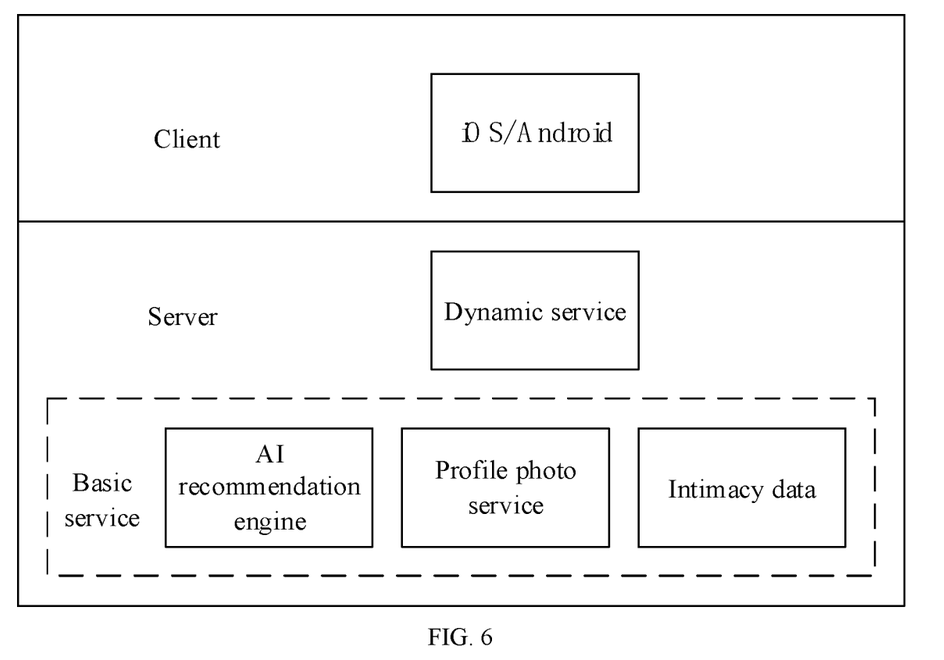
FIG. 6 is a diagram schematically showing a service architecture according to Embodiment 1 of the present application.

For further describing the method for displaying information on a page of the present application, FIG. 6 is a diagram of a service architecture of the method for displaying information on a page of the present application, where the service architecture includes a client and a server, and the client may use the iOS or Android system. The server may include a dynamic server and a basic server. The basic server includes an AI recommendation engine, a profile photo service and intimacy data module.

Figure 7:
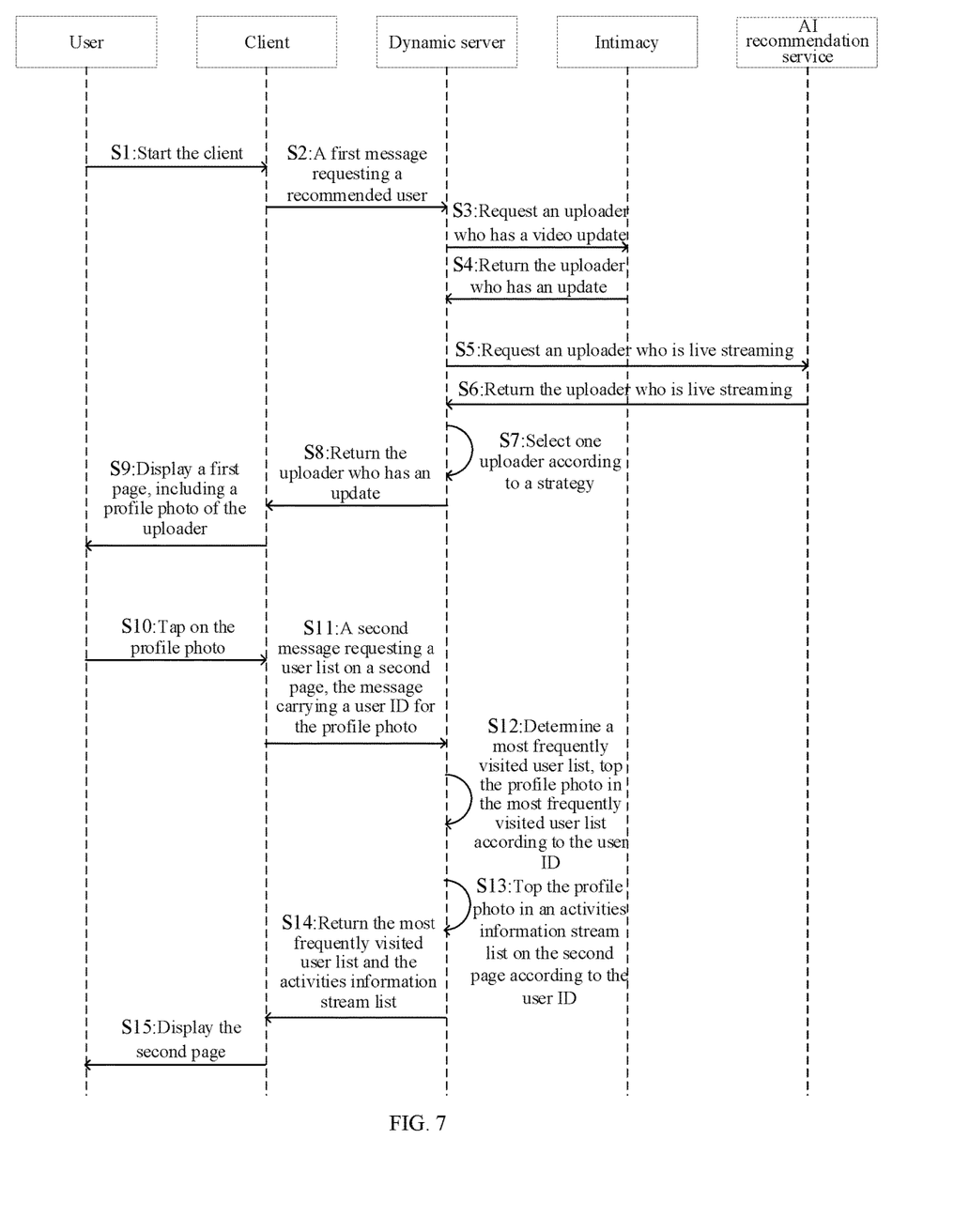
FIG. 7 is a sequence diagram schematically showing a method for displaying information on a page according to Embodiment 1 of the present application.

FIG. 7 is a sequence diagram of the method for displaying information on a page of the present application, including a user module, a client, a dynamic server, an intimacy module, and an AI recommendation service module, and specific processing steps are as follows:

step S1: starting the client;
step S2: sending a first message requesting a recommended creator;
step S3: requesting an uploader who has updated a video;
step S4: returning an uploader who has updated a video;
step S5: requesting an uploader who is live streaming;
step S6: returning an uploader who is live streaming;
step S7: selecting one uploader according to a strategy;
step S8: returning the uploader who has an update;
step S9: displaying the first page, including a profile photo of the uploader;
step S10: tapping on the profile photo;
step S11: sending a second message requesting a user list on the second page, the message carrying a user ID for the profile photo;
step S12: determining a most frequently visited user list, topping the profile photo in the most frequently visited user list according to the user ID;
step S13: topping the profile photo in the activities information stream list on the second page according to the user ID;
step S14: returning the most frequently visited user list and the activities information stream list; and
step S15: displaying the second page.

Embodiment 2

Figure 8:
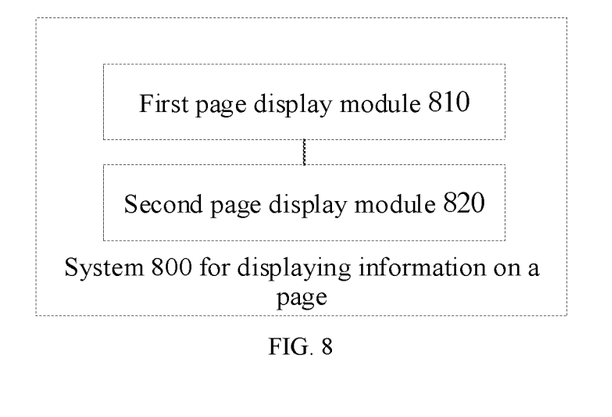
FIG. 8 is a block diagram schematically showing a system for displaying information on a page according to Embodiment 2 of the present application.

FIG. 8 is a block diagram schematically showing a system for displaying information on a page according to Embodiment 2 of the present application. The system for displaying information on a page may be divided into one or more program modules, and the one or more program modules are stored in a storage medium and executed by one or more processors to implement the embodiments of the present application. The program modules in this embodiment of the present application refer to a series of computer program instruction segments that can complete a specific function. The functions of the program modules in this embodiment of the present application are specifically described in the following description.

As shown in FIG. 8, the system 800 for displaying information on a page may include the following modules:

a first page display module 810 configured to: in response to an operation of starting a client, display a first page containing a navigation bar on the client, and display an image of a recommended creator in a preset area of the navigation bar; and a second page display module 820 configured to jump from the first page to a second page when a touch operation on the image of the recommended creator is detected, and display the image of the recommended creator at a top position in a fixed area of the second page, where the fixed area is used to display images of a plurality of users recommended based on user information.

In a preferred embodiment of the present application, the image of the recommended creator includes a first image used to indicate update of a recorded video and a second image used to indicate live streaming of a live streaming room.

In a preferred embodiment of the present application, the first page display module 810 includes:

a type determining sub-module configured to determine a type of an updated video corresponding to the recommended creator; and a first icon display sub-module configured to display the first image in the preset area of the navigation bar when the type of the updated video is a recorded type; or a second icon display sub-module configured to display the second image in the preset area of the navigation bar when the type of the updated video is a live streaming type.

In a preferred embodiment of the present application, the first page display module 810 includes:

a first message sending sub-module configured to send a first message requesting the recommended creator to a server;

an identification code receiving sub-module configured to receive an identification code corresponding to the recommended creator that is returned by the server in response to the first message; and an image display sub-module configured to display the image of the recommended creator in the preset area of the navigation bar based on the identification code corresponding to the recommended creator.

In a preferred embodiment of the present application, the navigation bar includes a second page control, and the preset area is a display area for the second page control on the navigation bar.

In a preferred embodiment of the present application, the system further includes:

an image hiding module configured to hide the image of the recommended creator when no touch operation on the image of the recommended creator is detected for more than a preset duration, and display the second page control in the preset area.

In a preferred embodiment of the present application, the second page display module 820 includes:

a second message sending sub-module configured to send a second message requesting a most frequently visited user list to a server;

a user list receiving sub-module configured to receive a most frequently visited user list returned by the server in response to the second message; and an image display sub-module configured to display an image list corresponding to the most frequently visited user list in the fixed area of the second page, and display the image of the recommended creator at a top position in the image list.

In a preferred embodiment of the present application, the second message carries an identification code corresponding to the recommended creator; and the most frequently visited user list is obtained by the server by determining a plurality of active users based on the user information, and sorting identification codes corresponding to the recommended creator and the plurality of active users.

In a preferred embodiment of the present application, the second page further includes an activities information stream list, and the system further includes:

an activities information stream list display module configured to display a video window corresponding to the recommended creator at a top position in the activities information stream list, and play an updated video corresponding to the recommended creator in the video window.

Embodiment 3

Figure 9:
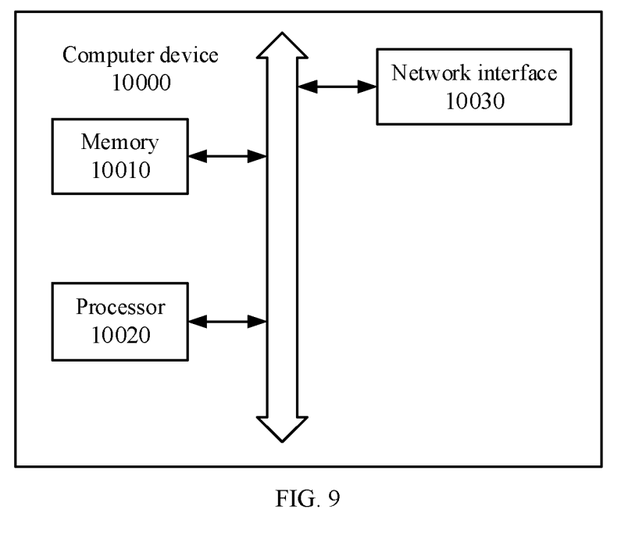
FIG. 9 is a schematic diagram schematically showing a hardware architecture of a computer device adapted to implement a method for displaying information on a page according to Embodiment 3 of the present application.

FIG. 9 is a schematic diagram schematically showing a hardware architecture of a computer device 10000 adapted to implement a method for displaying information on a page according to Embodiment 3 of the present application. In this embodiment, the computer device 10000 is a device that can automatically perform numerical calculation and/or information processing according to preset or prestored instructions. For example, the computer device may be a smartphone, a tablet computer, a notebook computer, a desktop computer, a rack server, a blade server, a tower server, a cabinet server (including a FEN standalone server or a server cluster composed of a plurality of servers), or the like. As shown in FIG. 9, the computer device 10000 at least includes, but is not limited to: a memory 10010, a processor 10020, and a network interface 10030 that may be communicatively linked to each other by using a system bus.

The memory 10010 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 10010 may be an internal storage module of the computer device 10000, for example, a hard disk or memory of the computer device 10000. In some other embodiments, the memory 10010 may alternatively be an external storage device of the computer device 10000, for example, a plug-in type hard disk equipped on the computer device 10000, a smart media card (SMC for short), a secure digital (SD for short) card, or a flash card. Certainly, the memory 10010 may alternatively include both the internal storage module of the computer device 10000 and the external storage device of the computer device. In this embodiment, the memory 10010 is generally configured to store an operating system and various types of application software installed on the computer device 10000, such as program codes for the method for displaying information on a page. In addition, the memory 10010 may be further configured to temporarily store various types of data that have been output or are to be output.

The processor 10020 may be, in some embodiments, a central processing unit (CPU for short), a controller, a microcontroller, a microprocessor, or other data processing chips. The processor 10020 is generally configured to control overall operation of the computer device 10000, for example, execute control, processing, and the like related to data interaction or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and other computer devices. For example, the network interface 10030 is configured to connect the computer device 10000 to an external terminal via a network, and establish a data transmission channel, a communication link, and the like between the computer device 10000 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 9 shows only a computer device having components 10010 to 10030, but it should be understood that not all of the illustrated components are required to be implemented, and more or fewer components may be implemented instead.

In this embodiment, the method for displaying information on a page that is stored in the memory 10010 may alternatively be divided into one or more program modules and executed by one or more processors (the processor 10020 in this embodiment) to implement the embodiments of the present application.

Embodiment 4

An embodiment of the present application further provides a computer-readable storage medium having a computer program stored thereon, where the computer program, when executed by a processor, implements the steps of the method for displaying information on a page in the embodiment.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed in the computer device, such as program codes for the method for displaying information on a page in the embodiments. In addition, the computer-readable storage medium may be configured to temporarily store various types of data that have been output or are to be output.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method for displaying information on a plurality of pages, comprising:

in response to an operation of starting a client application by a user, displaying a first page comprising a navigation bar and displaying one of a plurality of images of a recommended creator in a preset area of the navigation bar, wherein the first page is among the plurality of pages, and wherein the displaying one of a plurality of images of a recommended creator in a preset area of the navigation bar further comprises:

determining a type of an updated video corresponding to the recommended creator, displaying a first image in the preset area of the navigation bar in response to determining that the type of the updated video is a recorded type, wherein the first image is among the plurality of images of the recommended creator, and the first image is configured to indicate an update of a recorded video, and displaying the second image in the preset area of the navigation bar in response to determining that the type of the updated video is a live streaming type, wherein the second image is among the plurality of images of the recommended creator, and the second image is configured to indicate live streaming of a live streaming room;

determining whether a touch operation on the one of the plurality of images of the recommended creator is detected in a predetermined duration;

in response to determining that the touch operation on the one of the plurality of images of the recommended creator is detected in the predetermined duration, jumping from the first page to a second page among the plurality of pages and displaying the one of the plurality of images of the recommended creator at a top position in a predetermined area of the second page, wherein the predetermined area is configured to display images of a plurality of recommended creators based on information of the user; and in response to determining that no touch operation on the one of the plurality of images of the recommended creator is detected in the predetermined duration, hiding the one of the plurality of images of the recommended creator and displaying a control element associated with the second page in the preset area of the navigation bar.

2. The method according to claim 1, wherein the displaying an image of a recommended creator in a preset area of the navigation bar further comprises:

sending to a server a first message requesting for information corresponding to the recommended creator;

receiving an identification code corresponding to the recommended creator that is returned by the server in response to the first message; and displaying the image of the recommended creator in the preset area of the navigation bar based on the identification code corresponding to the recommended creator.

3. The method according to claim 1, wherein the displaying the image of the recommended creator at a top position in a predetermined area of the second page further comprises:

sending to a server a second message requesting for information indicating creators whose videos have been frequently visited by the user;

receiving the information returned by the server in response to the second message; and displaying an image list comprising the creators whose videos have been frequently visited by the user in the predetermined area of the second page, and displaying the image of the recommended creator at a top position in the image list.

4. The method according to claim 3, wherein the second message carries an identification code corresponding to the recommended creator;

wherein the information indicating creators whose videos have been frequently visited by the user is obtained by the server by determining a plurality of active creators based on the information of the user; and wherein the method further comprises generating the image list based on sorting identification codes corresponding to the recommended creator and the plurality of active creators.

5. The method according to claim 1, wherein the second page further comprises a dynamic information stream, and the method further comprises:

displaying a video window corresponding to the recommended creator at a top position of the dynamic information stream; and playing an updated video corresponding to the recommended creator in the video window.

6. A computing device, comprising a memory, a processor, and a computer program stored on the memory and executable by the processor, wherein the computer program, when executed by the processor, causes the processor to implement operations comprising:

in response to an operation of starting a client application by a user, displaying a first page comprising a navigation bar and displaying one of a plurality of images of a recommended creator in a preset area of the navigation bar, wherein the first page is among the plurality of pages, and wherein the displaying one of a plurality of images of a recommended creator in a preset area of the navigation bar further comprises:

determining a type of an updated video corresponding to the recommended creator, displaying a first image in the preset area of the navigation bar in response to determining that the type of the updated video is a recorded type, wherein the first image is among the plurality of images of the recommended creator, and the first image is configured to indicate an update of a recorded video, and displaying the second image in the preset area of the navigation bar in response to determining that the type of the updated video is a live streaming type, wherein the second image is among the plurality of images of the recommended creator, and the second image is configured to indicate live streaming of a live streaming room;

determining whether a touch operation on the one of the plurality of images of the recommended creator is detected in a predetermined duration;

in response to determining that the detecting a touch operation on the one of the plurality of images of the recommended creator is detected in the predetermined duration, jumping from the first page to a second page among the plurality of pages and displaying the one of the plurality of images of the recommended creator at a top position in a predetermined area of the second page, wherein the predetermined area is configured to display images of a plurality of recommended creators based on information of the user; and in response to determining that no touch operation on the one of the plurality of images of the recommended creator is detected in the predetermined duration, hiding the one of the plurality of images of the recommended creator and displaying a control element associated with the second page in the preset area of the navigation bar.

7. The computing device according to claim 6, wherein the displaying an image of a recommended creator in a preset area of the navigation bar further comprises:

sending to a server a first message requesting for information corresponding to the recommended creator;

receiving an identification code corresponding to the recommended creator that is returned by the server in response to the first message; and displaying the image of the recommended creator in the preset area of the navigation bar based on the identification code corresponding to the recommended creator.

8. The computing device according to claim 6, wherein the displaying the image of the recommended creator at a top position in a predetermined area of the second page further comprises:

sending to a server a second message requesting for information indicating creators whose videos have been frequently visited by the user;

receiving the information returned by the server in response to the second message;

generating an image list based on sorting identification codes corresponding to the recommended creator and the creators whose videos have been frequently visited by the user; and displaying the image list comprising the recommended creator and the creators whose videos have been frequently visited by the user in the predetermined area of the second page, wherein the image of the recommended creator is displayed at a top position in the image list.

9. The computing device according to claim 6, wherein the second page further comprises a dynamic information stream, and the operations further comprise:

displaying a video window corresponding to the recommended creator at a top position of the dynamic information stream; and playing an updated video corresponding to the recommended creator in the video window.

10. A non-transitory computer-readable storage medium, storing a computer program, wherein the computer program, when executed by at least one processor, causes the at least one processor to perform operations comprising:

in response to an operation of starting a client application by a user, displaying a first page comprising a navigation bar and displaying one of a plurality of images of a recommended creator in a preset area of the navigation bar, wherein the first page is among the plurality of pages, and wherein the displaying one of a plurality of images of a recommended creator in a preset area of the navigation bar further comprises:

determining a type of an updated video corresponding to the recommended creator, displaying a first image in the preset area of the navigation bar in response to determining that the type of the updated video is a recorded type, wherein the first image is among the plurality of images of the recommended creator, and the first image is configured to indicate an update of a recorded video, and displaying the second image in the preset area of the navigation bar in response to determining that the type of the updated video is a live streaming type, wherein the second image is among the plurality of images of the recommended creator, and the second image is configured to indicate live streaming of a live streaming room;

determining whether a touch operation on the one of the plurality of images of the recommended creator is detected in a predetermined duration;

in response to determining that the touch operation on the one of the plurality of images of the recommended creator is detected in the predetermined duration, jumping from the first page to a second page among the plurality of pages and displaying the one of the plurality of images of the recommended creator at a top position in a predetermined area of the second page, wherein the predetermined area is configured to display images of a plurality of recommended creators based on information of the user; and in response to determining that no touch operation on the one of the plurality of images of the recommended creator is detected in the predetermined duration, hiding the one of the plurality of images of the recommended creator and displaying a control element associated with the second page in the preset area of the navigation bar.

11. The non-transitory computer-readable storage medium according to claim 10, wherein the displaying the image of the recommended creator at a top position in a predetermined area of the second page further comprises:

sending to a server a second message requesting for information indicating creators whose videos have been frequently visited by the user;

receiving the information returned by the server in response to the second message;

generating an image list based on sorting identification codes corresponding to the recommended creator and the creators whose videos have been frequently visited by the user; and displaying the image list comprising the recommended creator and the creators whose videos have been frequently visited by the user in the predetermined area of the second page, wherein the image of the recommended creator is displayed at a top position in the image list.

12. The non-transitory computer-readable storage medium according to claim 10, wherein the second page further comprises a dynamic information stream, and the operations further comprise:

displaying a video window corresponding to the recommended creator at a top position of the dynamic information stream; and playing an updated video corresponding to the recommended creator in the video window.

* * * * *